US011108558B2

(12) United States Patent
Vortriede

(10) Patent No.: US 11,108,558 B2
(45) Date of Patent: Aug. 31, 2021

(54) AUTHENTICATION AND FRAUD PREVENTION ARCHITECTURE

(71) Applicant: Visa International Service Association, San Francisco, CA (US)

(72) Inventor: Eric Vortriede, Cottage Grove, OR (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 195 days.

(21) Appl. No.: 16/557,031

(22) Filed: Aug. 30, 2019

(65) Prior Publication Data

US 2019/0386830 A1    Dec. 19, 2019

Related U.S. Application Data

(62) Division of application No. 15/090,473, filed on Apr. 4, 2016, now Pat. No. 10,439,813.

(60) Provisional application No. 62/142,263, filed on Apr. 2, 2015.

(51) Int. Cl.
*H04L 29/06* (2006.01)
*H04L 9/32* (2006.01)

(52) U.S. Cl.
CPC ............ *H04L 9/321* (2013.01); *H04L 9/3226* (2013.01); *H04L 9/3242* (2013.01)

(58) Field of Classification Search
CPC ......... H04L 9/32; H04L 9/321; H04L 9/3226; H04L 9/3234; H04L 9/3236; H04L 9/3242
See application file for complete search history.

(56) References Cited

U.S. PATENT DOCUMENTS

| | | |
|---|---|---|
| 2007/0096872 A1 | 5/2007 | Nguyen et al. |
| 2008/0208746 A1 | 8/2008 | Royyuru et al. |
| 2009/0327135 A1 | 12/2009 | Nguyen et al. |
| 2011/0208658 A1 | 8/2011 | Makhotin |
| 2011/0258452 A1* | 10/2011 | Coulier ................. H04L 9/3271 713/171 |
| 2013/0041823 A1* | 2/2013 | Wagner .................. G06Q 20/32 705/44 |
| 2013/0125231 A1 | 5/2013 | Kuenzi |
| 2013/0198078 A1 | 8/2013 | Kirsch |
| 2013/0210412 A1 | 8/2013 | Larson et al. |
| 2013/0232083 A1* | 9/2013 | Smith ................ G06Q 20/3223 705/67 |
| 2013/0304648 A1* | 11/2013 | O'Connell ......... G06Q 20/3821 705/44 |
| 2014/0020073 A1 | 1/2014 | Ronda et al. |
| 2014/0037074 A1 | 2/2014 | Bravo et al. |

(Continued)

*Primary Examiner* — Amie C. Lin
(74) *Attorney, Agent, or Firm* — Kilpatrick Townsend & Stockton LLP

(57) ABSTRACT

Embodiments of the invention are directed to authentication and authorization methods. The authentication process can involve a user device interacting with an access device that is within a proximity of the user device to help ensure that the user device is near a location of the access device. The access device can assist with the authentication, either at the access device or via a communications network to an authentication computer. For example, embodiments can provide mechanisms for authentication of a user device at an access device before the user device is authenticated and authorized access to a building.

14 Claims, 9 Drawing Sheets

(56) References Cited

U.S. PATENT DOCUMENTS

2014/0108252 A1  4/2014  Itwaru et al.
2014/0310182 A1* 10/2014 Cummins .......... G06Q 20/3274
                                                  705/71
2015/0237026 A1  8/2015  Kumar

* cited by examiner

AUTHENTICATION AND FRAUD PREVENTION ARCHITECTURE

CROSS-REFERENCE TO RELATED APPLICATIONS

This application is a divisional application of U.S. application Ser. No. 15/090,473, filed Apr. 4, 2016, titled "AUTHENTICATION AND FRAUD PREVENTION ARCHITECTURE", which claims the benefit of U.S. Provisional Application No. 62/142,263, filed Apr. 2, 2015, titled "ENCRYPTION PRESENTMENT AND FRAUD PREVENTION ARCHITECTURE," which is incorporated by reference in its entirety for all purposes.

BACKGROUND

Resources are limited in supply and, in turn, access to these resources is often limited as well. For example, a building may house limited, but sensitive information. In some instances, the building may install an access device that allows individuals with a scannable card to enter the building. However, if the scannable card is stolen by a fraudster, the fraudster would be able to access the sensitive information within the building without additional authentication measures.

Other resources can be fraudulently accessed as well. For example, when a user device attempts to access a computing resource, the system that prevents widespread access to the computing resource may authenticate the user device before authorizing such access. When the authentication is conducted over a communication network, the fraudsters might be able to intercept the communication and access these computing resources over the network.

Thus, there is a need for better authentication and fraud prevention when authenticating and authorizing access to resources.

Embodiments of the invention address these and other problems, individually and collectively.

BRIEF SUMMARY

Embodiments of the present invention are directed generally to techniques for authenticating a user device. The authentication process can involve a user device interacting with an access device that is within a proximate distance of the user device to help ensure that the user device is near a location of the access device. The access device can assist with the authentication, either at the access device or via a communications network to an authentication computer. For example, embodiments can provide mechanisms for authentication of a user device at an access device before the user device is authenticated and authorized access to a building.

One embodiment of the invention is directed to a method performed by an access device, which stores an access device identifier. The method includes receiving at an access device from a user device, a user device identifier and a user device cryptogram of the access device identifier signed with a user credential. The user device identifier corresponds to the user device. The user credential may be registered with an authentication computer. The access device identifier may be obtained by the user device at the access device (e.g., a placard, an access device enabled to communicate via near field communication (NFC) messages, etc.). The method may include generating an authentication message using the user device cryptogram. The authentication message can contain the user device identifier, the access device identifier, and an access device cryptogram determined from data including the user device cryptogram. The method may also include transmitting, by the access device for receipt by the authentication computer, the authentication request message for determining an authentication by the authentication computer. The authentication computer can verify an authentication of the user device using the user device identifier, the access device identifier, and the access device cryptogram.

Other embodiments are directed to systems and non-transitory computer readable media associated with methods described herein. Other methods may be performed by various devices discussed herein.

A better understanding of the nature and advantages of the present invention may be gained with reference to the following detailed description and the accompanying drawings.

DEFINITIONS

Figure 1:
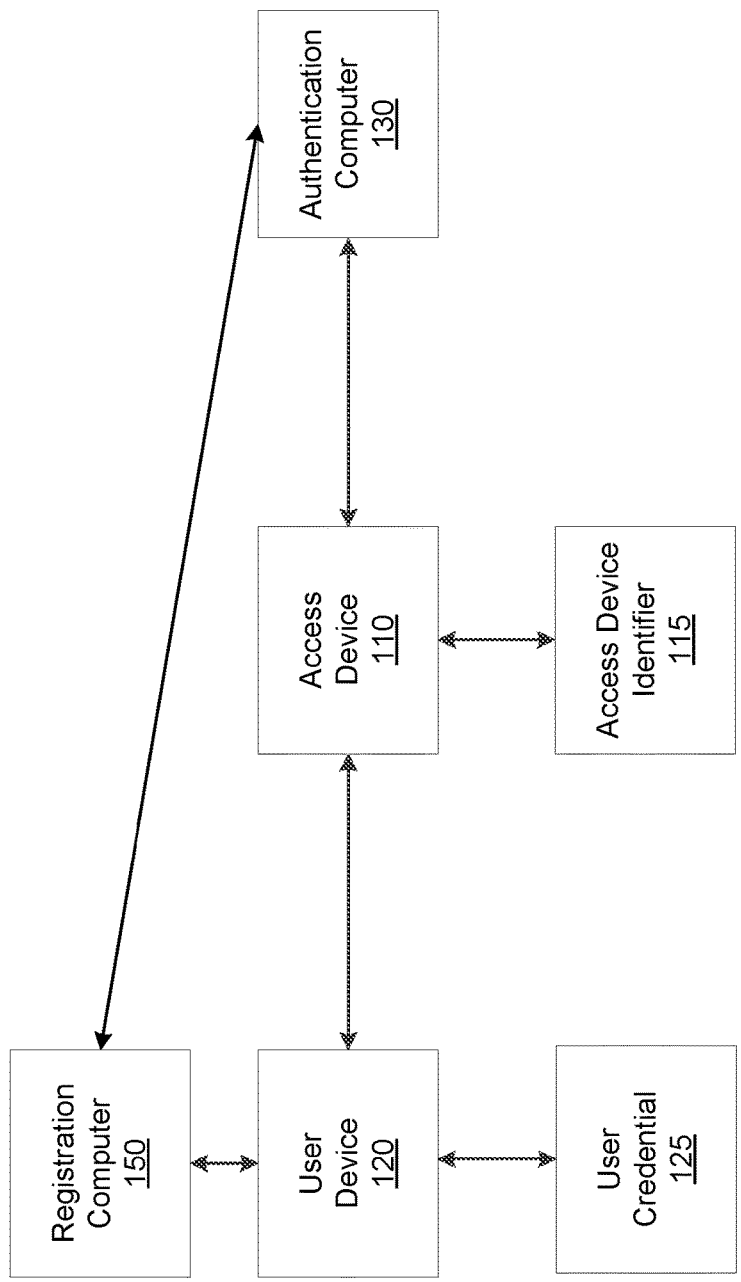
FIG. 1 depicts a block diagram of an authentication system used for authenticating the user device, including an access device, a user device, and an authentication computer in some embodiments of the disclosure.

A user credential can include a personal identification number (PIN). A user credential may be registered prior to authentication and authorization, and is not limited to a number, but can be characters, which can be represented as numbers when used to sign a message. In some examples, the user credential can be a private key associated with a user.

An identifier can include a unique code associated with a device, including an access device or a user device (e.g., a user device identifier or an access device identifier, etc.). The user device identifier uniquely identifies a user device and its profile to an authentication computer. The access device identifier uniquely identifies an access device (e.g., in the context of an authentication transaction). An access device identifier may be registered with an authentication or registration computer.

A cryptogram can include codified information. In some examples, the cryptogram can include a hash-based message authentication code (HMAC) of information (e.g., a user credential, etc.). Different cryptograms may use different information and different user credentials. The technology used in creating the HMAC (e.g., MD5, SHA1, SHA256, etc.) may not be critical to the disclosure, as any reasonably secure algorithm will function.

A prompt can include an indication to provide a user credential. A user may select two or more prompts during registration. The prompt may include a challenge question where the answer to the challenge question is the user credential. The prompts may help inform the user as to which credential to enter during an authentication process. The user can enter or select one prompt per credential during registration.

A user device can include a portable computing device that is in a user's possession when attempting an authentication (e.g., mobile phone or similar device, etc.). The user device can interact with an access device to affect access to resource(s) being protected by the access device. The user device may contain a software application to perform the methods prescribed herein for a user device.

An access device can include a computing device that may correspond with a fixed geographic location. The access device can protect resource(s) by acting as an intermediary between a user device and an authentication computer to affect an authentication of a user device and/or its user with an authentication computer. After a successful authentication, the access device may grant access to the requested resources or perform additional authorization methods as described herein. The access device may contain a software application to perform the methods prescribed herein for an access device.

A registration computer can include a computing device that communicates with user devices, access devices, and users of access devices or user devices (e.g., administrators, etc.) in order to register and/or receive information (e.g., identifiers, credentials, prompts, etc.) that can be used to authenticate. The registration computer may correspond with a collection of computers (e.g., a server farm) and/or may include the authentication computer. The registration computer may collect information from users and/or administrators.

An authentication computer can include one or more computing devices that store user device profiles and/or access device information. The authentication computer can communicate with access devices to authenticate user devices as described herein.

DETAILED DESCRIPTION

Embodiments disclosed herein are directed to techniques for authentication and fraud prevention. For example, systems and methods may help authenticate a user device through the use of an access device (e.g., a device affixed to a building for access to ingress/egress, etc.) and/or an authentication computer. The authentication process can use two or more user credentials to confirm the identification of the user device, and an access device identifier to confirm the access device. A cryptogram of the access device identifier can be used for the authentication so as to keep the user credential(s) secure. The authentication methods described herein may help ensure that the user device is near a location of the access device and/or the user operating the user device is the appropriate person and not a fraudster, with the help of the authentication computer.

I. Authentication

Authentication may be required in various environments. For example, a user may request to access a building that houses sensitive materials. The user may be authenticated prior to accessing the sensitive materials in the building (e.g., at the door, at a keypad, before entering a room/ building, etc.). In some examples, authentication may be required during a payment transaction (e.g., to confirm that a user attempting to pay for goods is the actual user associated with a payment identifier, etc.). In some examples, a user's identity may be confirmed before the user is able to perform other actions as well (e.g., prior to authorization, etc.).

Performing the authentication may help prevent fraud. For example, by authenticating the user prior to allowing the user to access the building that houses sensitive materials, the access to the sensitive materials can be protected. In some examples, only users that are authenticated may be authorized to access the sensitive materials and users that fraudulently attempt to access the materials can be thwarted.

In other examples, authentication can be performed when a user device and access device are within a proximate distance of each other. For example, the authentication process can accept near field communication (NFC) messages when data are transmitted between the user device, access device, and the authentication computer. At least some of the data may not be stored at each device (e.g., user credentials, etc.), causing the other device(s) to provide or to collect (e.g., from the user, etc.) the data during the authentication process.

Embodiments of the present invention provide numerous advantages. For example, the authentication of a user may help prevent fraud. In examples where a user may require access to a restricted location (e.g., a building, part of a building, or outside location enclosed within a fence or a wall), the authentication methods described herein may help prevent the access to the building unless the user device is authenticated. In other examples, such as with a payment transaction, the attempted fraud can be thwarted by authenticating that the user and the merchant are in substantially the same location at substantially the same time. When performing authentication with devices within a threshold distance of each other, the authentication can help confirm that the user attempting to conduct the transaction is the actual user and not a fraudster.

II. Signatures, Credentials, and Identifiers for Authentication

As discussed with Section I, a user device may be used for granting access to a resource through an intermediary access device that communicates with an authentication computer. As examples, the resource can be a building, a computer system, or a particular file or account stored on a computer system.

FIG. 1 depicts a block diagram of an authentication system used for authenticating the user device, including an access device, a user device, and an authentication computer in some embodiments of the disclosure. The authentication system 100 may comprise a plurality of devices including an access device 110, a user device 120, and an authentication computer 130. The user device 120 may be authenticated with an authentication computer 130 through an intermediary device, such as an access device 110. The access device 110 may help authenticate the user device 120 for access to the resource. In some examples, the access device 110 can include the electronic device (e.g., that is used later for receiving the user device identifier) and an object that is near the location of the access device (e.g., a placard, etc.).

The user device 120 can register with a registration computer 150, e.g., to obtain or communicate user credential 125. The user credential 125 can be a PIN, which may include any set of characters. Registration computer 150 can be in communication with or be the same as authentication computer 130. Access device 110 can also have registered with registration computer 150, where the registration involves an access device identifier 115 that corresponds to access device 110. Different access devices at different locations can have different access device identifiers.

Figure 2:
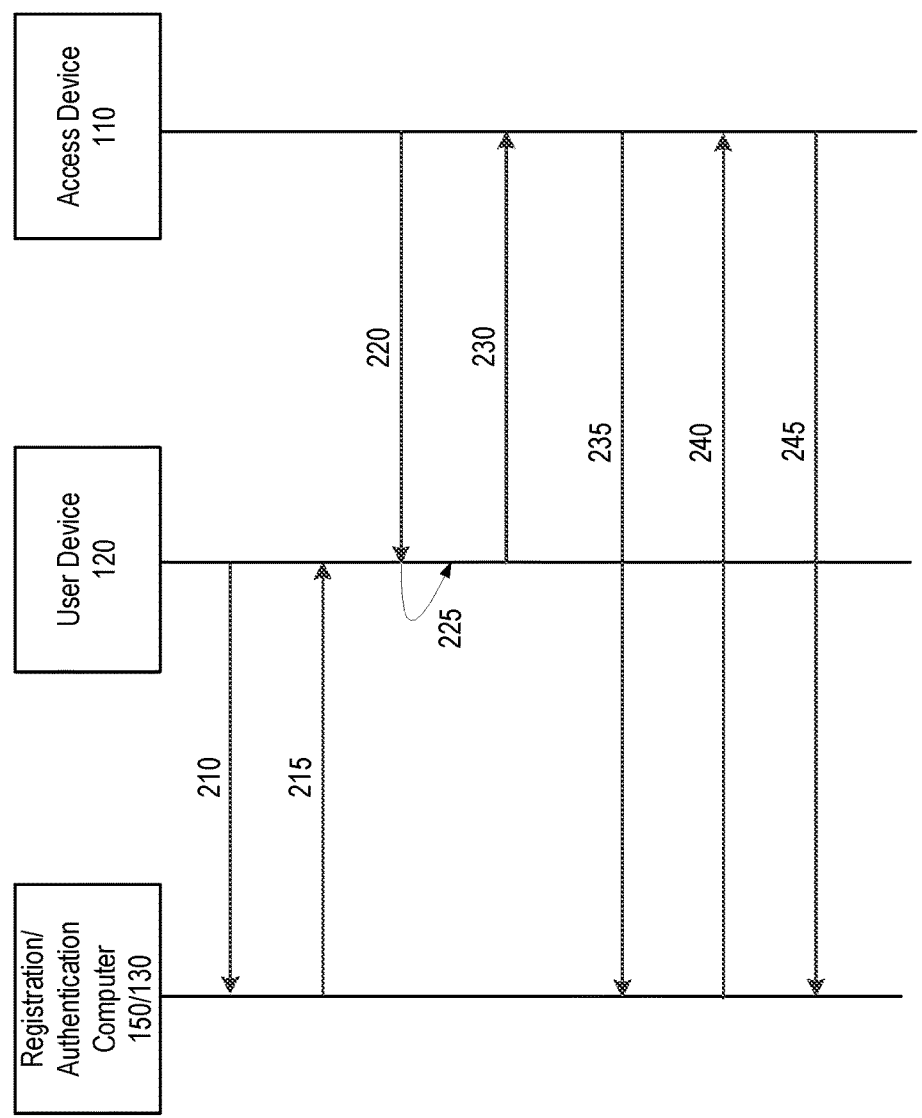
FIG. 2 illustrates an example flow of an authentication process between an access device, a user device, and an authentication computer in some embodiments of the disclosure.

FIG. 2 illustrates a process of authentication using one or more devices illustrated in FIG. 1. For example, at step 210 and before the user device 120 attempts authentication, the user device 120 may request to register with the authentication system 100 by communicating with a registration computer 150.

At step 215, the registration computer 150 can provide the user device 120 with means to identify itself to an authentication computer 130. This may include a user device identifier and/or one or more user credentials (e.g., PINs) and/or a software program (e.g., to prompt the user to provide the one or more user credentials, to create cryptograms and create an authentication request message, etc.).

The user may select and/or compose one or more user credentials. For example, when the user is setting up an account with authentication computer 130, the authentication computer can request that the user compose one or more prompts and corresponding PINs. The authentication computer 130 can identify one or more prompts to signal to the user to provide a corresponding user credential. The prompt may pose a question (e.g., what is your first PIN? etc.) or command (e.g., please provide your PIN associated with your anniversary, etc.). Thus, the user credential is not limited to a number, but can be characters, which can be represented as numbers when used to sign the message. The user can provide the user credential in response to the prompt(s) that may be displayed by the user device 120 and/or access device 110. The user can enter more than one user credential, where different user credentials may be provided in response to different prompts.

The prompts and user credentials may be stored at the authentication computer 130 and/or the user device 120. For example, the authentication computer 130 may comprise a data store that includes the user credentials and prompts. Each prompt may, for example, indicate which user credential to be entered during a transaction. The data store of user credentials and prompts at the authentication computer 130 may store the one or more prompts with their corresponding credentials, a user device identifier, and an account number associated with the authentication computer 130. The user credentials and prompts can also be stored at a secure storage medium (e.g., a hardware security module) at the user device 120 (e.g., unknown to other devices or entities, etc.).

The registration may occur after an agreement. For example, the user device 120 can select whether or not to provide a user device credential so that authentications with the user device 120 may be conducted without the user device credential. In another example, one or more user credentials may be required based in part on a threshold value associated with a later authorization, as determined by the access device 110 or authentication computer 130. For example, when a transaction exceeds the threshold purchase amount (e.g., more than $20, etc.), the user credential may be required. Similarly, access device 110 may select whether or not the user credential is required during an authentication process. In some examples, the preferences of the access device 110 may supersede the preferences associated with the user device 120 that were established during registration. In some examples, the user device 120 or access device 110 can select a threshold amount associated with the transaction and/or building access that might require one or more user credentials.

The access device 110 may also receive an access device identifier during registration process (e.g., the access device identifier 115). The access device identifier may be transmitted to the access device 110 from the authentication computer 130, registration computer 150, or the like. The access device identifier 115 may correspond with the access device that can uniquely identify the access device 110 to the authentication computer 130. In some examples, the access device identifier 115 may identify the location of the access device to the authentication computer 130 (e.g., by encoding a geolocation of a substantially immovable access device with the access device identifier, by associating the access device identifier with a global positioning system (GPS) device, etc.).

In some examples, the access device 110 may include a physical object (e.g., a placard) separate from an electronic device that interacts with user device 110, where the physical object includes the access device identifier and is received at the physical location of the access device 110 as part of the registration process. For example, a placard may be displayed with the access device 110. The placard can include a QR code and/or NFC token that identify the access device 110 location and its characteristics (e.g., a merchant identifier, etc.). The placards may also include a logo to indicate that the access device 110 is capable of participating in an NFC communication and/or transaction.

At step 220, an access device information message may be transmitted between the user device 120 and the access device. For example, the user device 120 may obtain the access device identifier 115, at the access device 110, e.g., from the access device 110 itself or from an object at the access device, such as a placard with a QR code or NFC tag. The access device identifier 115 may be displayed at a location near the access device 110 (e.g., at a placard, etc.) or by the access device 110 (e.g., a QR code, NFC, etc.).

At step 225, after the user device 120 receives (e.g., by scanning with a scanning component of the user device 120, etc.) the access device information message containing the access device identifier 115 at the access device 110 to initiate the authentication process at the user device 120, the user device 120 can select a prompt to display to the user to obtain a user device credential. Once the prompt has been selected, the user device 120 can request a user device credential from the user (e.g., user credential 125). The user can provide the user device credential to the user device 120. In other examples, the user device 120 can receive the user credential from a secure storage, without the user having to provide the user credential via an input device. Thus, a prompt would not be needed in all embodiments. Various techniques can be used to select a prompt or a user credential, e.g., when multiple user credentials may exist, as is described in more detail below.

In response to receiving the user credential at the user device 120, the user device 120 can generate a user device cryptogram by applying the user credential 125 to the access device identifier 115. The user device cryptogram may be a first cryptogram and/or a cryptogram that is generated at the user device. The user device cryptogram may correspond with the user. The user device cryptogram can be used later by authentication computer 130 to authenticate the user device 120, as described below. The user device cryptogram can be provided to the access device 110 in a user device message, which may be sent in a variety of ways. For example, the user device message can be generated as a code (e.g., barcode, QR code, combination of characters/numbers, image, etc.), and the user device 120 can display the code, where the code can correspond to the user device message. Thus, the code (user device message) can include the user device cryptogram. The code can include further information, such as a user device identifier (e.g., of user device 120) or other identifying information of the user device 120, and a second prompt that may be in a following step. The second prompt may be selected by the software application installed at the user device 120. Different sets of prompts corresponding to user credential(s) may be selected at the user device 120 based on a user credential selection algorithm(s).

At step 230, a user device message may be transmitted between the user device 120 and the access device 110. For example, the access device 110 can receive this message from the user device 120, where the message includes a user device identifier and the user device cryptogram. The access device 110 can already store the access device identifier 115, e.g., as obtained in a registration process. As examples, the message can be received as a displayed QR code (e.g., by scanning with a scanning component of the access device 110, etc.), an NFC communication, Bluetooth communication, or other local communication. For example, the access device 110 may scan the QR code from the user device 120.

The access device 110 can decode at least a portion of the user device message to display the prompt for the access device credential, if access to the resource requires or if the message indicated that an access device credential is to be used. The access device credential may correspond with the user. The user may provide the access device credential to the access device. In some examples, the access device credential may be a second user credential (e.g., PIN, etc.).

The user can provide an access device credential to the access device 110. The access device credential may be used (e.g., along with the user device cryptogram, etc.) to create an access device cryptogram that can be included in an access device authentication request message (e.g., an authentication request message) that is eventually sent to the authentication computer 130. For example, the access device cryptogram can be generated by creating an HMAC using data including the user device cryptogram and the access device credential.

In some embodiments, the access device authentication request message can include both the cryptograms and indicate which data corresponds to which cryptogram. The authentication request message can include further data (e.g., data about a transaction between the user device 120 and the access device 110), such as information about a resource or information about items to be received as part of a transaction. In other embodiments, just the first cryptogram (e.g., when no second prompt is needed) or just the second cryptogram is sent. In some examples, both cryptograms may always be created, but not necessarily using the user credentials, and the access device cryptogram may be transmitted to the authentication computer 130. If one or both user credentials are not required, the devices can substitute other information in place of one or more user credentials. If this is done, the access device authentication request message may comprise data sufficient for the authentication computer to determine the data that was substituted for the user credential (e.g., a transaction amount or a flag to indicate that the substitution was made, etc.) in order to transmit to the authentication computer 130.

The access device 110 may add the access device identifier 115, a transaction amount, or other information to the access device authentication request message without decoding the user device message. The receipt of the access device authentication request message may help confirm the user device 120 is at a location associated with the access device 110. This may also help confirm that the access device identifier 115 (e.g., a placard associated with the access device 110, etc.) and the access device 110 are in the same location. For example, the user device cryptogram may be created using the access device identifier 115 and the access device authentication request message may contain the access device identifier 115 associated with the access device 110 itself.

At step 235, an access device authentication request message may be transmitted between the access device 110 and the authentication computer 130. For example, the access device authentication request message may be generated and transmitted to the authentication computer 130 to finish the authentication. The access device authentication request message can include data from both devices (e.g., user device identifier, access device identifier 115, access device cryptogram, etc.). Additional details regarding the authentication process are described with Section III through Section V.

At step 240, an authentication response message may be transmitted between the access device 110 and the authentication computer 130. For example, the authentication computer 130 can confirm authentication (e.g., using one or more user credentials stored at the authentication computer 130) and transmit the confirmation of authentication to the access device 110 in the authentication response message. In some examples, the authentication computer can confirm that both the user device cryptogram and access device cryptogram correspond with the user and/or user device 120. The authentication request message may be transmitted from the access device 110 without further encryption. The authentication computer 130 can transmit an authentication response to the access device 110. Once the user device 120 is authenticated, the access device 110 may initiate an authorization process (e.g., authorized to perform some action, etc.).

The user device cryptogram can be used to determine whether the correct user device credential was used. A user profile can be identified based on the authentication request message, and the user profile can be accessed to select the appropriate user device credential. As is explained in a later section, various techniques can be used to select the appropriate user device credential when multiple user credentials are possible. The selected user credential can be used to create a new cryptogram by using it to create an HMAC (hash-based message authentication code) with a corresponding part of the authentication request message. The authentication request message can identify which part of the message corresponds to the clear text that should be signed to authenticate the user device cryptogram. The new cryptogram (e.g., HMAC) can then be compared to the user device cryptogram, where a positive authentication occurs with the two cryptograms match. A negative authentication may occur when the cryptograms do not match (e.g., the authentication may be declined, etc.). The access device cryptogram can be authenticated in a similar manner.

In some embodiments, the access device cryptogram can be used to determine whether the correct credentials were used. Because the user device cryptogram was used to create the access device cryptogram, the authentication computer can recreate the user device cryptogram by generating the HMAC of the access device identifier 115 (e.g., from the access device authentication request message) and the user device credential which the authentication computer has on file in the user device profile. The access device cryptogram can then be recreated by generating an HMAC of the recreated user device cryptogram and the access device credential. Authentication may be successful when the recreated access device credential is equal to the access device credential from the authorization request message. In some embodiments, additional information can be used in creating the user device cryptogram (e.g., as long as the additional information is available to both the user device 120 and the authentication computer 130 and/or is agreed upon ahead of time, etc.). In some embodiments, additional information can be used in creating the access device cryptogram as long as the additional information is available to both the access device 110 and the authentication computer 130 and is agreed to ahead of time.

At step 245, an authorization message may be optionally generated by the access device 110, e.g., when a further authorization process is needed before access can be granted to user device 120 for the resource. The access device 110 may include, for example, a transaction amount to the authorization message and transmit the message (e.g., to a processor, to an issuer, to an authentication or authorization computer, etc.). In some examples, the authentication request message or the authentication response message may be transmitted to a processor to receive a token and the authorization message may be transmitted with the token to receive authorization for the transaction (e.g., between a token provider and the authorization computer, etc.). In other examples, only a single authorization message may be transmitted (e.g., with or without the token) to authorize the transaction. Additional details regarding the authorization process is described with Section VI.

Additional processes may be conducted after the user device is authenticated, and any further authorization performed by other computers, e.g., an authorizations server. In some embodiments, the access device 110 can provide an authorization signal to another device to provide access to the user device. The access can be to various resources, such as a building or a computer. The authorization signal can be provided to a device that allows access. In other embodiments, the access device can be the resource to which access is being granted.

As an example, the user device 120 may gain access to the building after authentication (e.g., the access device 110 is an access terminal associated with the building or a verification computer, etc.). By gaining access, the access device 110 may receive a response message from the authentication computer 130 that confirms that the user device 120 is authorized to perform the action. In this example, the action may correspond with entering the building. Once the response message is received, the access device 110 may authorize access to a door mechanism to the user device (e.g., by unlocking the door, etc.). The door mechanism can be any combination of mechanical and electronic components. The access device 110 can send an authorization signal to the electronic components to actuate the mechanical components to provide access for the user device 120, and correspondingly to the user, when a response message indicates a positive authentication. When the response is a negative authentication, the access may be declined. In another example, the user device 120 can gain access to a computer, e.g., confidential data, which may be a profile of the user. In such an example, the access device can provide authorization to the computer (e.g., remote computer or one connected to the access device) to allow the user device 120 to gain access (e.g., to log on to the computer). In another example, the user device 120 may conduct a payment transaction with a merchant who is operating the access device 110 (e.g., at a point of sale (POS) terminal, etc.).

III. Authenticating a User Device

Figure 3:
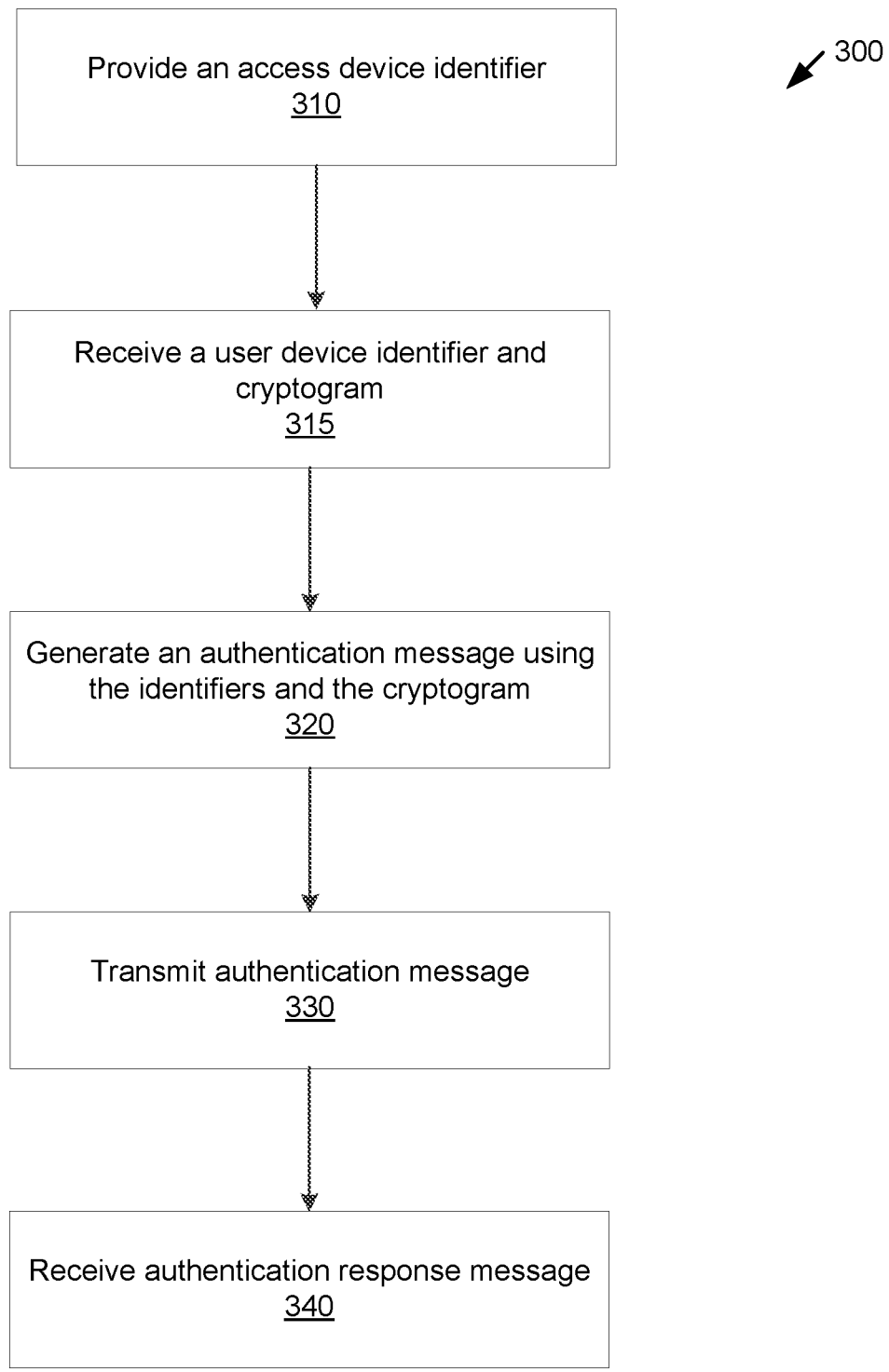
FIG. 3 depicts an example authentication process performed by an access device or authentication computer.

A user device may be authenticated by providing one or more user credentials or other data discussed herein. In some examples, the user may be authenticated based in part on a threshold value as well. FIG. 3 depicts a process for authenticating the user device by the access device 110 and/or the authentication computer 130. The method 300 may be implemented by the access device 110.

A. Interactions with an Access Device

At step 310, the access device 110 may provide the access device identifier 115 as part of an access device information message. The access device information message may be presented using various methods, including by displaying the message (e.g., QR code), receiving the message via a wireless communication (e.g., using a near field communication (NFC) antenna, etc.), displaying a placard at a location associated with the access device, offering to transmit the message via a wired communication, or other means of providing data known in the art.

The user device 120 may receive the presented access device identifier 115 from the access device 110 (e.g., scanning the access device information message, receiving the communication, taking a picture, tapping to initiate the NFC, etc.). For example, the user device may use a camera or other optical device to scan the access device information message QR code. In some examples, the scan of the access device identifier 115 may be accessed through a transmission of a message from the access device 110 to the user device 120. The user device 120 may receive the message comprising the access device identifier 115 and/or the access device identifier 115 through the scan. The user device 120 may obtain the access device identifier 115 using a software application installed at the user device 120.

In some examples, scanning the access device identifier 115 may help confirm that the user device 120 and access device 110 are located within a proximity of each other (e.g., confirmation occurring later in the process with the authentication computer 130, confirmation identified in the authentication response message, etc.). For example, the scan may be enabled within a short distance of each device. In another example, the user device 120 and access device 110 may exchange the access device identifier 115 within a threshold distance (e.g., near field communication (NFC), infrared scanning, etc.).

Once the user device receives the access device information message (e.g., a QR code), the user device 120 may prompt the user to provide a user device credential to the user device 120, or otherwise just select the user device credential from secure storage. In some examples, the software application or other module installed with the user device 120 can receive the user credential at the user device 120. In some embodiments, the user device 120 does not perform any check on the entered user credential.

The user device credential can be used to create a user device cryptogram from the access device identifier 115. Other data can also be part of the plain text that is included in the generation of the user device cryptogram. The user device cryptogram can be included in a user device message. The user device message can encode various information including the user device cryptogram, a user device identifier, prompt for an access device credential, or other information.

Once the user credential is received at the user device 120, the user device 120 can generate the user device message. Once the user device has generated the user device message, it may be made available to the access device 110 by displaying the message (e.g., as a QR code or bar code, etc.)

that can be optically scanned by the access device. The message can be transmitted to the access device by wired or wireless communications (e.g., NFC, Bluetooth®, etc.) or other means of providing data known in the art.

The user device 120 may provide the user device message as a QR code. For example, the user device 120 may comprise a screen and enable the QR code to display at the screen associated with the user device 120. The display may be within a proximate distance of the access device 110, so that, for example, the access device 110 can scan the QR code as it is displayed by the user device 120.

At step 315, the access device 110 may receive a user device message comprised of a user device identifier and a user device cryptogram using any combination of the following methods. For example, the access device 110 can scan a QR code from the user device 120. Thus, the user device 120 can transfer the data to the access device 110 when the access device 110 scans the QR code that is displayed by the user device 120. Other transfer methods of providing the data are available as well, including an NFC exchange, wired/wireless communication, etc. The access device 110 can already store the access device identifier.

At step 320, the access device 110 may generate an access device authentication request message. (e.g., using the data from the user device message, etc.). The access device authentication request message may include an access device cryptogram, user device identifier, access device identifier, purchase amount, and/or other information.

The access device credential may be used to generate an access device cryptogram. For example, a user device cryptogram may be created using the access device identifier 115 with the user device credential and an access device cryptogram may be created using the user device cryptogram with an access device credential. The access device cryptogram can be included with the access device authentication request message that will be transmitted to the authentication computer 130, e.g., as described above for FIG. 2.

The authentication process may transfer a cryptogram in place of a user credential so that the user device credential and/or access device credential are never transferred. Instead, the user device credential and/or access device credential may be used to generate a cryptogram associated with the data locally at the user device or access device. Once signed with the user credential, the digitally signed data may be used to authenticate the user device. In some examples, the cryptogram can replace the user credential to confirm identity.

At step 330, the access device 110 may transmit the access device authentication request message. For example, when the access device 110 generates the access device authentication request message, the access device 110 can transmit the message to the authentication computer 130.

At step 340, the access device 110 can receive the authentication response message from the authentication computer 130 after the authentication computer determines the authenticity of the user device and credential(s). The authentication response message can comprise an approval or decline flag to identify whether the user device 120 is authenticated. In some examples, the authentication response message may be transmitted to the access device 110 (e.g., to inform the user device 120 whether it is authenticated, to initiate a payment transaction, to initiate access to a building, etc.). In some examples, the authentication response message may comprise a new user credential. In some examples, the new user credential can be used to provide authorization of the user (e.g., to gain access to the building, to initiate a payment transaction, etc.). In some examples, the authentication response message may contain the resource being requested. This may include, for example, a document, account number, payment token, or encryption key.

Once the user device 120 is authenticated, the access device 110 may initiate an authorization process (e.g., authorized to perform some action, etc.). For example, as discussed above, an authorization message may be optionally generated by the access device 110, e.g., when a further authorization process is needed before access can be granted to user device 120 for the resource. The access device 110 may include, for example, a transaction amount to the authorization message and transmit the message (e.g., to a processor, to an issuer, to an authentication or authorization computer, etc.). In some examples, the authentication request message or the authentication response message may be transmitted to a processor to receive a token and the authorization message may be transmitted with the token to receive authorization for the transaction (e.g., between a token provider and the authorization computer, etc.). In other examples, only a single authorization message may be transmitted (e.g., with or without the token) to authorize the transaction.

Additional processes may be conducted after authentication and authorization. For example, the user device 120 may gain access to the building after authentication (e.g., the access device 110 is an access terminal associated with the building or a verification computer, etc.). The access may be granted by the access device 110 sending an authorization signal to another device (e.g., a door mechanism or a gateway computer that provides access to a computing resource), or simply by generating an internal authorization signal sent to itself. In another example, the user device 120 may conduct a payment transaction with a merchant who is operating the access device 110 (e.g., at a point of sale (POS) terminal, etc.).

B. Operations by Authentication Server

The authentication computer 130 can receive and analyze the communication that contains the access device cryptogram. In some embodiments, the access device cryptogram in the overall authentication process may be the user device cryptogram received by the authentication computer 130. For example, the authentication computer 130 may decode the access device authentication request message to identify the user device and/or access device information. The authentication computer 130 can analyze the received user device identifier and/or find corresponding data associated with the user device identifier in a database. The corresponding data may comprise, for example, user profile information (e.g., user name, account number, expiration date, user device identifier, credentials and prompts, etc.) or information associated with the access device.

In some examples, the authentication computer 130 can identify one or more user credentials used to create the cryptograms used in generating the authentication request messages. The user credentials may be stored during the registration in the user credential/prompt database. The authentication computer 130 may validate the access device cryptogram using the stored data.

The user device credential and access device credential may be verified with data stored during the registration process. For example, the authentication computer 130 may be associated with a database of user credentials that, when queried, can confirm or deny that the user device and access device credentials correspond with the identity of the user device 120 requesting authentication. For example, the user device 120 may be associated with a user device credential "000" and an access device credential "111." When the access device cryptogram is received at the authentication computer 130 which was generated using the access device credential and the user device cryptogram which was generated using the user device credential and the access device identifier 115, the authentication computer 130 can recreate the user device cryptogram from the user device credential (stored in the authentication computer database) and the access device identifier 115, and then recreate the access device cryptogram from the recreated user device cryptogram and the access device credential. If the recreated access device cryptogram is equal to the received access device cryptogram (e.g., which is also the user device cryptogram received by the authentication computer 130), both user credentials may be confirmed. The user credentials may not be transmitted outside of the cryptograms.

The authentication computer 130 can validate the user device 120 by reconstructing the user device cryptogram from the access device identifier 115 and the user device credential (e.g., as retrieved from the user device profile) then reconstructing the access device cryptogram from the recreated user device cryptogram and the access device credential (e.g., also from the user device profile).

The user device 120 may be authenticated when the user credentials match credentials that were stored during the registration process at the authentication computer (e.g., as validated by the authentication computer accurately recreating the access device cryptogram, etc.). For example, the user device 120 may be authenticated based in part on the data associated with the user that is operating the user device. If the data is correct, the authentication computer 130 can generate the authentication response message and transmit the authentication response message to the access device 110.

C. Variations of Authentication Based on a Threshold Value

The prompts that correspond with user credentials may be selected at least in part on a threshold value. For example, once the user credentials and corresponding prompts are generated during the registration process, the user credentials may be used for authentication. The user credentials may be used when the dollar amount of the payment transaction exceeds a threshold value (e.g., more than $10, at least $20, etc.). In some examples, a user device credential may be required but an access device credential may not be required when the transaction value is below a threshold value, or vice versa. Thus, a user may be required to enter a user device credential to a user device, but not required to enter an access device credential to the access device. In such situations, the access device can automatically use a substitute access device credential, where the access device credential can be a default credential (e.g., a prompt sent in the user device message from the user device to the access device) that does not correspond to the access device credential used when the amount is above a threshold. Instead of an amount of a transaction, a security level of the resource can be used, e.g., whether a building or computer are high security, where the security level can be stored at the access device.

In some examples, access device 110 may require a user device credential and an access device credential when the transaction value is above a threshold value. Other entities may also require more than one user credential based in part on the threshold value, including the authentication computer 130. When the transaction value (or other metric) is above the threshold value, the software application at the user device may require the user device credential. In some examples, when the transaction value (or other metric) is above the threshold value, the authentication computer 130 may withhold the authorization of some future action until either user credential is received as part of the authentication of the user device 120.

The threshold value may also be associated with a time. For example, the user device 120 may include a timestamp with the authentication request message. When the authentication computer 130 (or proxy device) attempts to authenticate the user credential, the authentication computer 130 may confirm that the authentication request message was generated within a threshold time of the time included with the message (e.g., one second, one minute, etc.). This may help ensure that the authentication of the user device 120 is within a timeframe.

In some examples, a plurality of user credentials may be stored at the authentication computer 130 for a given user device profile. The selection of which user credentials are used in an authentication may be determined in an agreement between user device 120 and authentication computer 130. For example, user device 120 could have five user device credentials and six access device credentials in its profile and use the seconds of a timestamp modulo 5 (e.g., 0:12 mod 5=2) to select the user device credential to be used and the timestamp modulo 6 (e.g., 0:12 mod 6=0) to select the access device credential. The timestamp (or any other sufficiently entropic value used in the selection) can be sent in the access device authentication request message to the authentication computer 130 so that authentication computer 130 could select the same credentials (e.g., for recreating the cryptogram(s) or other methods which require user credentials).

Authentication may be conducted without the use of one or more user credentials such that, when certain criteria are met, the user may not be required to enter one or more user credentials. Instead, the authentication may be conducted based in part on one or more threshold values. For example, the criteria may correspond with a transaction amount. The access device 110 may attempt to initiate a payment transaction and identify a transaction amount. When the amount of the transaction is under a threshold value, the user device 120 may provide the user device credential for authentication to the access device 110, but the access device 110 may not request the access device credential. In some examples, the access device 110 may provide and/or generate a substitute access device credential when the authentic access device credential is not collected (e.g., due to a threshold not being exceeded, etc.), and use that substitute credential in generating the access device cryptogram. When this is the case, the access device authentication request message may contain sufficient information (e.g., the transaction amount and threshold value) such that the authentication computer 130 can select the same substitute user credential, such that the cryptograms can be accurately reproduced by the authentication computer 130.

In some embodiments, a user could opt out of providing the user device credential (e.g., user credential which is entered on the user device), in which case the authentication computer 130 could incorporate a user credential with the software application value that may be implemented in place of other user credentials.

A counter may be implemented. For example, a counter may identify a number of consecutive invalid attempts to provide a correct user credential. If a predetermined threshold number of invalid attempts are made (e.g., 3, 10, or any other number determined by the authentication computer, etc.), the account may be associated with a flag (e.g., not in good standing, associated with fraud, deactivated, etc.). When the cryptograms match at the authentication computer 130, the counter may be reset.

IV. Selecting User Credentials Using a Selection Algorithm

A selection algorithm may be implemented. In one example, the user device 120 may implement the selection algorithm. For example, the selection algorithm may be used to select a prompt. In response to the prompt, the user or user device 120 may provide a user credential that corresponds with the prompt.

A. Selection Algorithm for a Single User Credential

A selection algorithm may help determine a user credential. For example, the user may identify a single prompt and user credential to provide in response to the prompt. The selection algorithm may, in turn, select the single prompt/user credential to use during an authentication process of the user device.

Figure 4:
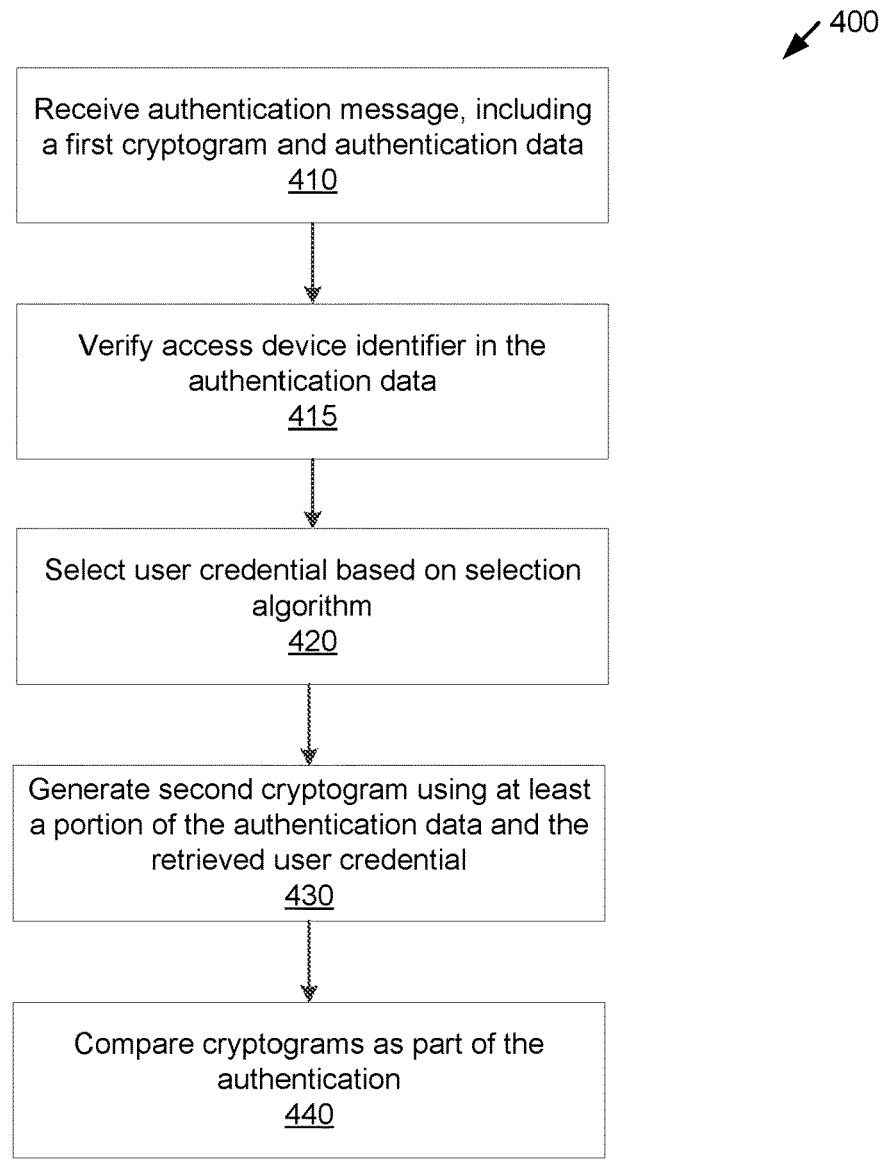
FIG. 4 illustrates an example authentication process for authenticating a user device.

FIG. 4 illustrates a method for authenticating a user device from a perspective of an authentication computer using at least one cryptogram. The illustration 400 in FIG. 4 may be implemented by any device discussed herein, including the authentication computer 130.

At 410, a user device cryptogram and authentication data may be received. The authentication data may comprise the access device identifier 115. The user device cryptogram may be generated using any of the methods discussed herein, which can refer to this cryptogram as the "access device cryptogram." This cryptogram may be generated by the access device by creating a hash-based message authentication code (HMAC) of the cryptogram from the user device (e.g., the user device cryptogram generated by creating an HMAC of the access device identifier and the user device credential) and the access device credential.

The user device credential can be obtained and used as described herein. The authentication data may comprise a user device identifier a timestamp, and/or a transaction amount.

At 415, the access device identifier 115 may be verified. For example, the access device identifier may be provided by the access device to the authentication computer 130 in an access device authentication request message. The authentication computer 130 can confirm that the access device identifier 115 matches the access device identifier that was provided to the access device during a registration process (e.g., received originally during registration of the access device, etc.). The matching may be performed by comparing the characters in each access device identifier to confirm that they are the same.

At 420, an access device credential may be selected based on the selection algorithm. The access device credential may be selected to correspond to what the authentication computer expects is the correct user credential, i.e. to be the same as the user device credential, if the user device is authentic. A user profile can be determined based on a user device identifier received in the authentication data. The user profile can be established at the authentication computer, e.g., via a registration process at a registration computer connected to the authentication computer, or via a computer that acts as both. Thus, the access device credential can be registered with the authentication computer in association with a user device.

The user profile can have a user credential stored in association with the user profile. The authentication computer can select the user credential based on the assumption that the selected user credential would have been used to create the cryptogram, if the user device is authentic. As described herein, multiple user credentials can be stored, where a specific user credential is selected based on a selection algorithm, which is also employed at the user device, so that the same user credentials should be employed when the user device is authentic.

At 430, an access device cryptogram may be generated. The access device cryptogram may be generated using at least a portion of the authentication data and the retrieved access device credential. The access device cryptogram can be generated using any of the methods discussed herein.

As a sample illustration, the access device cryptogram can be generated by the authentication computer upon receiving an authentication request message from the access device. The authentication computer can recreate the user device cryptogram using the access device identifier from the received authentication request message and the user device credential (e.g., which is stored at the authentication computer in the user device profile). The authentication computer can recreate the access device cryptogram from the recreated user device cryptogram and the access device credential (e.g., stored in the user device profile on the authentication computer).

At 440, the cryptograms may be compared as part of the authentication. The cryptograms may be compared, for example, in a character by character comparison. When the cryptograms are the same, then it can be confirmed that the cryptogram was generated using the same user credential. This confirmation can be used to authenticate the user and/or the user device. Other factors can also be used, e.g., matching other cryptograms. In some examples, if the recreated access device cryptogram is equal to the cryptogram in the received authentication request message, the authentication is successful.

The authentication computer 130 can generate an authentication response message to notify the access device 110 whether the authentication is approved. For example, the authentication response message may comprise an approval or decline flag to identify whether the user device 120 is authenticated. In some examples, the authentication response message may be transmitted to the access device 110 (e.g., to inform the user device 120 whether it is authenticated, to initiate a payment transaction, to initiate access to a building, etc.).

The authentication computer 130 may receive an authorization request message after the user device 120 is authenticated. For example, the access device 110 may initiate an authorization process (e.g., authorized to perform some action, etc.) by optionally generating an authorization message, e.g., when a further authorization process is needed before access can be granted to user device 120 for the resource. In some examples, the received authorization request message may include a token and the authorization message may be transmitted with the token to receive authorization for the transaction (e.g., from a token provider computer, etc.). In other examples, only a single authorization message may be transmitted (e.g., with or without the token) to authorize the transaction.

The selection algorithm may select a single user credential to authenticate a user device, as illustrated with FIG. 4. In some examples, the selection algorithm may implement other processes for selecting a user credential to authenticate a user, as discussed below.

In some examples, the seconds portion of a timestamp may be divided by a number of stored user device credentials. The remainder from the division may be used as an index to the stored user device credentials. For example, when credentials are entered during registration, the registration process can separate these credentials into two sets so that a credential that is entered at the user device is never entered at the access device. For an example where there are two credentials, when the portion of the timestamp is odd, selecting one credential associated with an odd timestamp from a set of user credentials; and when the portion of the timestamp is even, selecting another user credential associated with an even timestamp from the set of user credentials. As another example, a multiple of 5 can be used to select the fourth user credential and prompt from the list of available user credentials and prompts.

In one embodiment, the user may provide a user device credential to create a user device cryptogram and an access device credential to create an access device cryptogram. Both cryptograms can be used to help authenticate the user at the authentication computer 130. The different user credentials can be provided by the user in response to different prompts, as is described herein. In such an example, the authentication request message can indicate which cryptogram corresponds to the first prompt and which cryptogram corresponds to the second prompt. The authentication computer can then select a user credential corresponding to each prompt, create a new cryptogram using the corresponding data, and determining whether the new cryptograms match the received cryptograms. In other examples, a single prompt may correspond with multiple user credentials and/or the user device 120 may provide the user credential automatically in response to the single prompt (e.g., stored in a secure storage location at the user device 120).

B. Shared Arrays of Prompts

In some examples, the selection algorithm may select a user credential from a set of more than one user credentials/prompts to help authenticate a user. For example, the authentication computer 130 may implement two distinct sets of prompts with corresponding user credentials: one set to be used at the user device 120 and one set at to be used an authentication computer 130. The user device and access device credentials/prompts may be stored with the authentication computer 130 in one or more lists. In some examples, the user credentials/prompts may be stored in mutually exclusive lists.

In some examples, the prompts may be provided to the user device 120 in two arrays: user device credential prompt array and access device credential prompt array. The user device 120 may select one of the prompts from each array: from user device credential prompt array to display (e.g., at step 225 in FIG. 2) and from access device credential prompt array to send to the access device 110 (e.g., at step 230 in FIG. 2). The algorithms used for selecting the prompts on the user device 120 may be identical to those being used by the authentication computer 130 (e.g., in order for the prompts to match the user credentials during authentication, etc.). Once the arrays are constructed, the prompt/user credential may be selected based on time (e.g., using the seconds portion of a timestamp mod the length of the prompt array, etc.).

For example, when the user device 120 generates the code for the access device 110 to scan, the code can embed a prompt for the access device credential. The access device 110 can display this prompt. The user can provide the access device credential in response to that displayed prompt.

C. Selection Algorithm Using Timestamps

The user device 120 can obtain a timestamp corresponding to the authentication request, which may also affect the use of the selected prompt(s). This timestamp may be used to select which prompts are used. For example, the user device 120 can provide a prompt corresponding with the access device credential. The user device 120 can then compute the second code for the access device 110 to receive (e.g., including SHA-1 HMAC on the user device identifier, salt, authentication computer identifier, timestamp, and the entered user credential, etc.). For example:

User Device identifier: 232423
Salt: 2aae6c35c94fcfb415dbe95f408b9ce91ee846ed
Authentication Computer Identifier: 41234
Timestamp (e.g., in Unix time): 1427989885
User Credential: 2468
SHA-1 HMAC: 4f34ea2b0402cb318e54a5e99a2a20524ae23352

A Secure Hash Algorithm 1 (SHA-1) HMAC may correspond with a particular hash function and/or encryption algorithm known in the art. Other hash functions may be used without diverting from the essence of the disclosure.

The data sent to the access device 110 can include another prompt corresponding with the timestamp (e.g., user credential 4, etc.) and other information, including a user device identifier, authentication computer identifier, timestamp, and cryptogram. The access device 110 can display the prompt and the user can enter 4321. The access device 110 can compute a cryptogram using, for example, SHA-1 HMAC on the user device identifier, timestamp, HMAC from the user device 120, sale amount ($1.00), and one or more user credentials. For example:

User Device identifier: 232423
Timestamp (e.g., in Unix time): 1427989885
SHA-1 HMAC (e.g., from the user device): 4f34ea2b0402cb318e54a5e99a2a20524ae23352
Sale amount: 1.00
User Credential: 4321
SHA-1 HMAC: 7b2c255de1d931be3537afc012076ef2fbea5aa7

The SHA-1 HMAC (e.g., 7b2c255de1d931be3537afc012076ef2fbea5aa7 from the access device 110) may be sent to the authentication computer 130 with a user device identifier, timestamp, and sale amount. The authentication computer 130 can use the user device identifier to locate the user account information and reconstruct the first and second SHA-1 HMAC. If the second SHA-1 HMAC matches what was sent by the access device, the user account may be authenticated.

The salt or other shared secret between the user device and the authentication computer can be combined with the user credential entered by a user. The salt can be updated periodically in a re-provisioning process.

D. Selection Algorithm Using a Counter

A counter may be implemented with the selection algorithm. For example, the selection algorithm may correlate the odd number of the counter with a user device credential and an even number with an access device credential. The corresponding prompts (e.g., the first or second prompt, etc.) may be displayed at the user device 120 to receive the corresponding user credentials (e.g., via manual entry, via NFC, etc.). The counter may be incremented with each authentication attempt.

Other methods of determining which prompt to select may be implemented as well (e.g., select a prompt using a multiple of three, select the next prompt in the list based on which prompt was selected previously, select a prompt based on a shared secret, etc.).

V. Tokens in Authentication and Authorization

In some examples, an account number or other sensitive data may be replaced with a token in the authentication or authorization messages. A token may be used to replace data during authentication or later during authorization.

A. Confirming Devices Prior to Token Generation

The authentication computer 130 may validate the user device 120 prior to generating a token. For example, the authentication computer can confirm that the user device 120 corresponds with the user device identifier in the request by, for example, determining whether the user device identifier exists, is in good standing, and is active in a user device identifier database. If not, the authentication may be denied.

Before generating a token, the authentication computer 130 may determine one or more prompts and corresponding user credentials. For example, the determination of which prompt to select may be based in part on a timestamp or other selection algorithm discussed herein. The user credentials can be received after one or more interactions between access device 110 and user device 120. The authentication data and one or more cryptograms (e.g., signed by the user credential(s), etc.) can be transmitted to the authentication computer 130 to authenticate. The authentication request message may be determined to be valid, in part because the message may be determined to originate from the user device and the user credentials (if entered) are correct. If the cryptograms do not match, the request may be declined.

B. Providing a Token During Authentication

A token may be used with authentication. For example, a token may include an alphanumeric code that replaces or is a substitute for a primary account number or other identifier. It may have any suitable form. For example, the token may comprise a string of alphanumeric characters of any suitable length. In some cases, the token may have the same number of characters as a real account identifier. An authentication computer can receive a token from a token provider computer.

Two or more computers may communicate regarding an account number, including a token provider computer and authentication computer 130. The communication may comprise a token (e.g., based on a primary account number (PAN), etc.) that the authentication computer has associated with a user. Other user device information may be transmitted as well. In some examples, the token provider computer may not store any information about the user or user device.

C. Providing a Token During Authorization

The token may be provided by a processor. For example, the processor may send a request message to generate the token to an authentication computer (e.g., via a payment network, etc.). The request message can comprise one or more cryptograms (e.g., to confirm the origin of the request, etc.). The authentication computer 130 can validate the cryptograms. If the cryptograms are authenticated, the authentication computer may request the token from the token provider computer.

Another authentication process may be conducted. The authentication computer may receive the token from the token provider computer and send the token to the processor in a response message (e.g., using similar communication channels as the request message, etc.). The processor can transmit the token to the access device (e.g., associated with a point of sale terminal and/or cashier device, etc.). When received, the access device can generate an authorization message that includes the token and route the message to the token provider computer, as discussed later in the specification. The token provider computer can detokenize the request to generate an account identifier and send the account identifier to the authorization computer.

In some examples, the authentication computer 130 can validate the user device information and obtain the token from the token provider computer. The token may be returned to the user device via a processor. For example, the user device can receive the token from the authentication computer and/or provider computer and use the token to conduct a transaction (e.g., similar to a process that would use a primary account number, etc.). This may include typing the alphanumeric characters of the token at the access device (e.g., as a manual transaction at a point of sale (POS) terminal), simulating swiping a card including the token with an auxiliary induction coil (e.g., as a card swipe transaction), tapping a device including the token at another device to transfer the token using NFC, or the like.

In some embodiments, a single use token may be implemented. For example, the token provider computer can provide the single use token to use with a single authorization process. The single use token may be provided to the access device, which can include the token to the authorization request message to correspond with the user device.

VI. Examples of Authorizing a Device

Various environments can implement the authentication and/or authorization methods and systems discussed herein. Two sample environments may include accessing a building and conducting a payment transaction. Other environments are available as well without diverting from the essence of the disclosure.

A. Gaining Access to a Building

One implementation of the process involves authenticating a user device to gain access to a building. For example, the user device may register for user credentials prior to requesting access to the building.

A building placard may display an access device identifier for scanning. The identifier may comprise the form of a QR code or any other identifier format described herein. The user device may scan the placard using a camera associated with the user device and/or tapping the placard to exchange the identifier via NFC.

The data from the placard can be received by the user device. This may include an identifier associated with the building. Once received, the user device may request a user device credential by displaying a first prompt. The user can provide the user device credential to the user device and transmit a digitally signed message to the building access device.

The building access device receives the digitally signed message and displays a second prompt. The user may provide an access device credential in response to the second prompt at the building access device. In some examples, the access device credential and/or prompt may be skipped (e.g., based on a timestamp, based on a lower security level for the building, etc.). The access device credential may be used to generate an access device cryptogram.

The building access device may generate an authentication request message with the received cryptogram(s) and additional authentication data. The communication may be transmitted to a token processor that generates a corresponding token. The token may be transmitted back to the building access device.

Once received, the token may be added to an authorization message to allow the user device to access the building. For example, the authorization message may comprise the token, building identifier, or other transaction information. An authorization computer (e.g., issuer computer) can accept or decline access to the building and transmit an authorization response back to the building. This may accept or decline access to the building and allow the user to enter the building.

B. Conducting a Payment Transaction

The authentication and authorization processes discussed herein may be implemented with a payment transaction as well. For example, a merchant may operate an access device. In some embodiments, the access device may comprise or be part of a point of sale (POS) device. In some embodiments, the access device may be separate from the POS device. For example, some merchants may use an antique POS device that that has limited computing capability and be limited in its ability to authenticate a user. When a fraudster steals and attempts to use a payment account (e.g., a credit card) at the antique POS, the antique POS would have little ability to determine that the fraudster is not the user associated with the payment account. Embodiments of the disclosure may help authenticate the user, despite the antique POS/access device.

Figure 5:
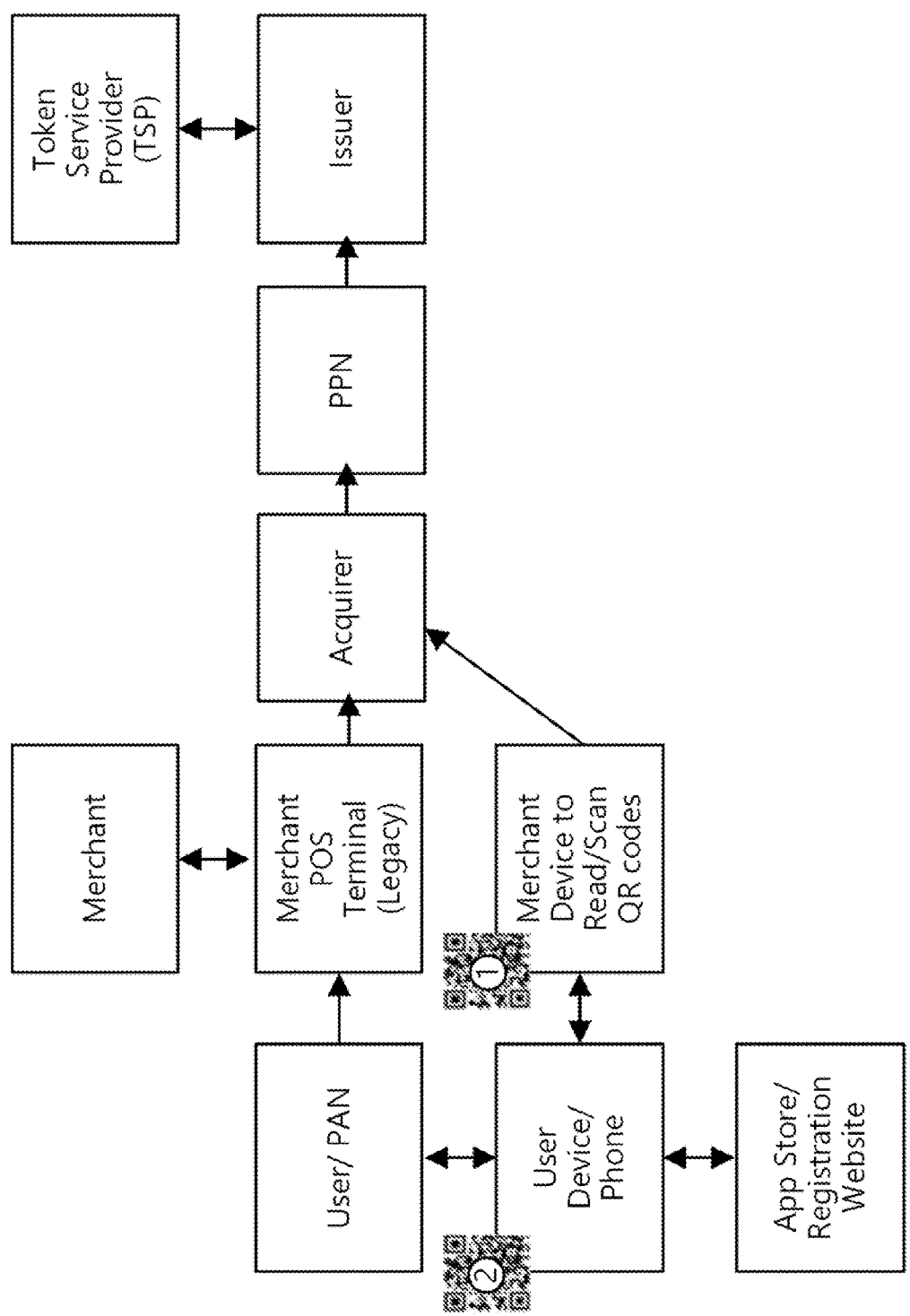
FIG. 5 illustrates a payment system utilizing an authentication and authorization process.
Figure 6:
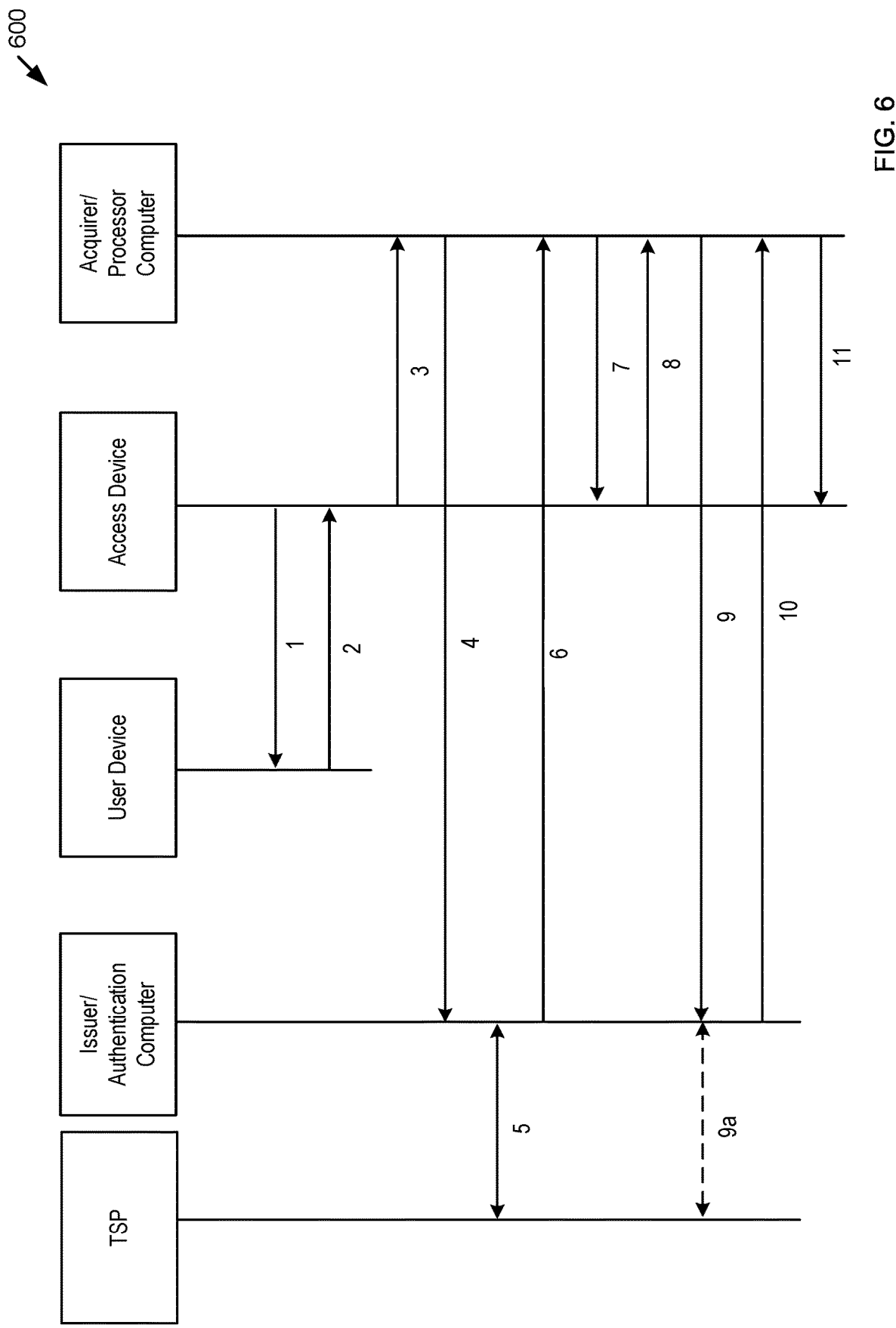
FIG. 6 illustrates an example flow of a payment system utilizing an authentication and authorization process.

FIG. 5 illustrates an example of a payment transaction using at least some of the authentication and/or authorization methods discussed herein. FIG. 6 illustrates an example flow of a payment system utilizing an authentication and authorization process. The process 600 may begin with registration and/or provisioning, as illustrated with Section III. In some examples, the authentication computer may be an issuer computer (e.g., that manages a payment account of a user, etc.) and a processor computer may be an acquirer computer (e.g., that manages a payment account of the merchant, etc.).

At block 1 of FIG. 6, a user device uses a software application to read/receive the access device information (e.g., placard information or information presented by an access device operated by a merchant). The placard may comprise a QR code, NFC token, or other access device identifier that the user device may scan, that contains information that identifies the merchant. The user device can scan or tap the placard (e.g., or other portions of the access device, etc.) to receive the QR code, NFC token, or other access device identifier.

The software application on the user device can present a first prompt (e.g., if the amount passes a threshold value, if the merchant or authentication device requires the prompt/user credential, etc.). The software application can receive the user device credential in response to the first prompt. Once the user device credential is entered, the software application can generate a cryptogram using the user device credential, information from the access device information (e.g., scanned from the access device, placard or NFC tag, etc.), and/or other user information. The user device credential may be used to create the cryptogram and may not be saved on the user device. In some embodiments, the user credential may be provided based in part on an opt-in or opt-out notification. For example, a merchant or user may opt-out of requiring the user credential in which case it would not be collected by the user device. In some embodiments, the user may opt in or out during registration with the authentication computer and this selection may be stored at the authentication computer with the user device profile and may also be stored on the user device. In some embodiments the merchant may opt in or out when the placard, NFC token, or access device is registered.

The access device 110 can scan or otherwise receive the first authentication request (e.g., NFC, etc.) containing the cryptogram that the user device has generated and the user device identifier. Part of the information passed to the access device 110 by the user device can include another prompt that will be used should the access device require an access device credential. The access device credential, when entered by the user, can be used together with the user device cryptogram to create another cryptogram for the authentication request message to be passed to the authentication computer. The access device can display a second prompt. The user can provide the access device credential to the access device in response to the second prompt. The access device may display the prompt and collect the access device credential based on a threshold transaction amount.

At block 2, if the first authentication request message which contains the user device identifier and user device cryptogram is displayed by the user device (e.g. second QR code, etc.), the access device may scan the first authentication request message (e.g., using a software application or scanner associated with the access device, etc.). In some embodiments, where the access device is separate from the point of sale terminal (e.g., old POS device with limited computational abilities, etc.), the access device may act as an auxiliary device associated with the POS device. Once the first authentication request message has been transferred to the access device, the access device may display the prompt from the first authentication request message. In response, the user can enter an access device credential on the access device (e.g., via a PIN pad, software application, user interface, etc.).

In some embodiments, user credentials may not be provided. For example, the access device credential may be provided when an amount of the transaction is above a threshold (e.g., $5, $10, etc.). When the amount of the transaction is under that amount, the access device may not request the access device credential. In some embodiments, a user could opt out of the requirement for providing the user device credential which is entered on the user device. Whenever a user credential is not collected, a substitution for the credential may be made by the software applications at the user device, access device, and/or authentication computer. For example, the user device credential may not be collected by the user device (e.g., due to opt out) in which case the user device may use other information (e.g., the prompt that would have been used had the user device credential been collected) as a substitute for the user device credential to generate the user device cryptogram.

Providing user credentials may be affected by either the user device or access device. For example, the access device can override user preferences for entering user credentials and the user device can insist on user credentials being entered when the access device does not require them. In some embodiments, the user device can determine that an access device credential (e.g., which is entered at the access device) is always required. In some examples, the access device can determine a threshold amount of a transaction below which they do not require user credentials. For purchases above the threshold, the access device credential may be requested and below the threshold amount may be requested only if the user has selected the option to always require the access device credential. No user credential entry may be required for some authentication processes.

At block 3, the access device can generate an authentication request message to send to the processor computer. In some embodiments, the access device may use the processor computer as an intermediary between the access device and the authentication computer.

At block 4, acquirer computer may identify an authentication computer from the authentication request message (e.g., a bank identification number or BIN may be encoded in the user device identifier that may be part of the authentication request message) and send the authentication request message to the authentication computer. The authentication computer may comprise, for example, an entity (e.g., a bank or agent of a bank) that authenticates user devices, issues and administers credit card and/or bank accounts, authorizes transactions based in part on funds associated with the user's account, and the like.

In some embodiments, acquirer computer can transmit the data through a payment processing network to be received by the authentication computer. The authentication computer may validate the cryptograms with the user device credential and access device credential that authentication computer has stored previously.

The authentication computer can determine whether to authenticate the user device using the authentication request message (e.g., by recreating the cryptograms and comparing the recreated access device cryptogram to the cryptogram in the authentication request message, as described elsewhere).

In some examples, the user credential may be associated with a token and/or generated to include a token. The authentication request message can contain data from an access device identifier (e.g., point of sale (POS) QR Code, a uniform resource locator (URL) to be used to contact a wallet provider, information that the wallet provider uses to identify and authenticate the user device, and/or information that the wallet provider uses for identifying the method of payment, etc.).

At block 5, authentication computer may request and receive a token from TSP. The TSP computer may be one example of a token service provider computer. The TSP can comprise an entity, residing on a payment network, which receives primary account numbers (PANs) and issues tokens that replace PANs on the payment network. The TSP may also de-tokenize transaction messages on a payment network to generate the original PAN from a token included with the transaction message.

The token may correspond with the user data (e.g., the primary account number (PAN), user information, etc.). The authentication computer may transmit a token request to the TSP. In some examples, the authentication computer can validate one or more cryptograms in the authentication request message and, if they are valid, obtain a token from the TSP which may be returned in the authentication response message to the processor computer and access device. In some embodiments, the authentication computer may send the PAN that corresponds to the user device profile in the authentication response.

At block 6, authentication computer can transmit the token or PAN back to processor computer. The token or PAN may be transmitted in the authorization response message or other message to use with the transaction processing.

At block 7, acquirer computer can transmit the token or PAN to access device. In some embodiments, processor computer could affect the authorization transaction, but may be restricted based on the type of access device is implemented at the merchant location.

At block 8, the access device can initiate a payment transaction using the token or PAN. For example, the token or PAN may be manually entered at the access device. Alternatively, an induction coil connected to the access device can be used to mimic a card swipe. In some embodiments (e.g., where both the access device and an separate POS device are near field communication (NFC) capable), the payment information (PAN or token) may be wirelessly transmitted for authorization during the payment transaction by the access device. The POS device may transmit the authorization request message to acquirer. In some embodiments, the access device and POS device are the same device, in which case the access/POS device may directly upon receipt of the authentication response message, send an authorization request to the acquirer or processor.

At block 9, acquirer computer can send the authorization request message to a payment processing network (not shown), and then to authentication computer (e.g., issuer computer, etc.). In some embodiments, at block 9a, the authorization request message may be routed to TSP which exchanges the token for a primary account number (PAN), and forwards the authorization request message to issuer of the account for processing. In some embodiments, the authorization request may contain a PAN rather than a token in which case no token/PAN exchange will be made and the payment network may send the authorization request to the issuer directly.

At block 10, authentication computer can determine whether to approve or decline the transaction. The authentication computer can then generate an authorization response message and transmit the message back to the processor computer over the payment processing network.

At block 11, acquirer computer may forward the authorization response message to communicate the approval/decline of the transaction to POS device. In some embodiments, the POS device and the access device are the same device.

In some examples, a transaction processor may receive the token from the TSP and generate an authorization request message containing the token (e.g., instead of or substitute for a primary account number (PAN), etc.). The authorization request message may be transmitted to the TSP.

In some examples, the TSP can detokenize the authorization request message and send the message to the authorization computer. In some examples, the authentication computer and authorization computer may be the same device. The authorization computer authenticate the transaction and the can determine whether to authorize the transaction. The approval or decline determination may be included with an authorization response message that is transmitted from the authorization computer to the processor. The transaction processor can transmit the authorization response message to the merchant access device.

In some examples, proxies may be implemented (e.g., authentication proxy, authorization proxy, processing network computer proxy, issuer proxy, acquirer proxy, etc.). For example, some of the production and provisioning of physical credit cards, account identifiers, or other information may be outsourced by issuers to third parties. In some examples, the authentication computer may interact with a proxy or agent entity or computer. The proxy or agent of the authentication computer can issue an account identifier that corresponds with the user device (e.g., by keeping track of a bank identification number (BIN) of the primary account number (PAN)). The access device may never interact directly with the authentication computer and instead may interact with the authentication computer's proxy or agent.

In some examples, a website may be implemented to interact with one or more devices. For example, the website may include a web page to register user software application, a service to receive and transmit transaction information from merchant software application, and/or a data transfer service to interact with internal services (e.g., at a payment processing network or TSP) to obtain tokens for account identifiers. In embodiments where a registration page is implemented, the registration page may communicate with a database to store information about the user (e.g., an account identifier, nickname, user/access device identifiers, credentials, PINs, QR codes, etc.).

Embodiments disclosed herein may also help authentication in a payment transaction setting. For example, many existing point of sale (POS) systems do not support transaction flows involving tokenization. The technical and business cost of converting the existing systems to support tokenization can hinder the improvement to the technology. Without implementation of authentication, tokenization, or other fraud prevention methods discussed herein, such fraud can be more pervasive.

VII. System Devices

Figure 7:
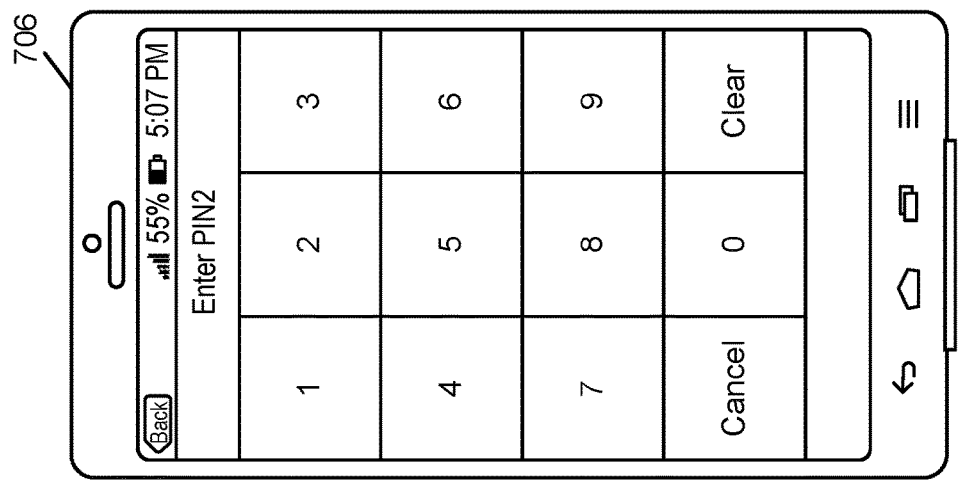
FIG. 7 depicts example user interfaces.
Figure 7:
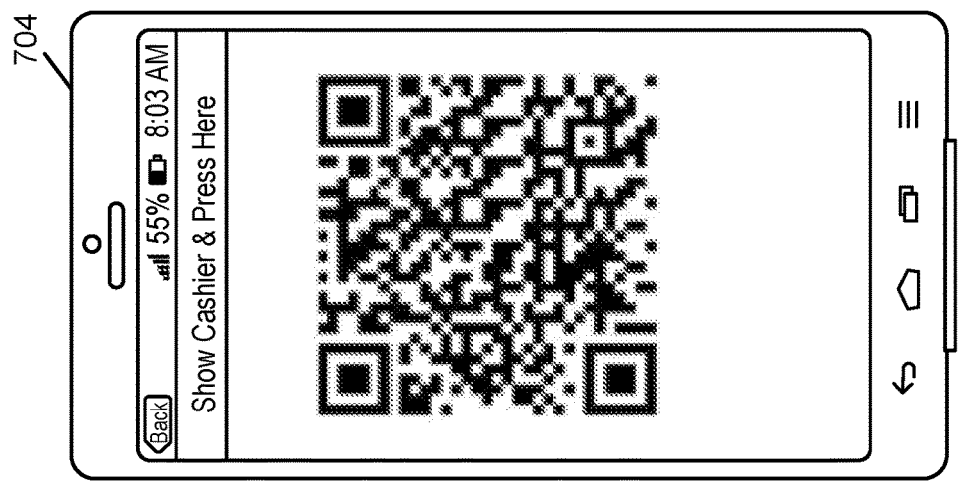
Figure 7:
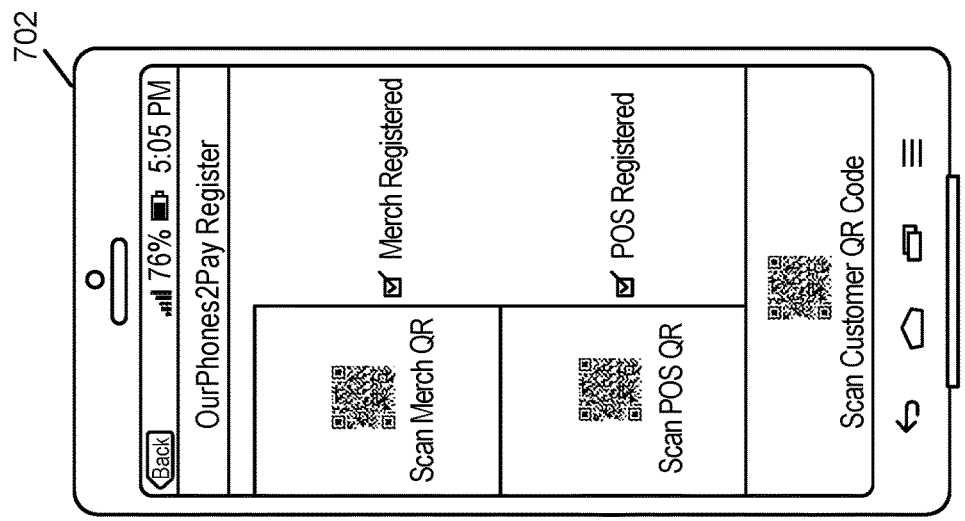
Figure 8:
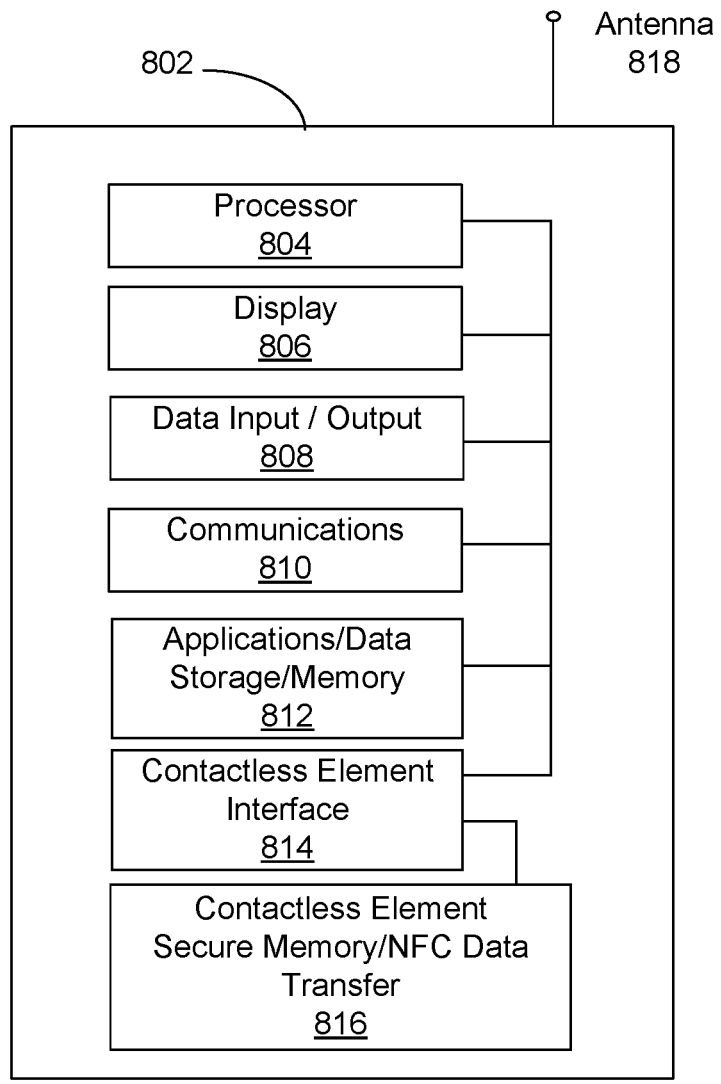
FIG. 8 illustrates a block diagram illustrating a portable communication device.
Figure 9:
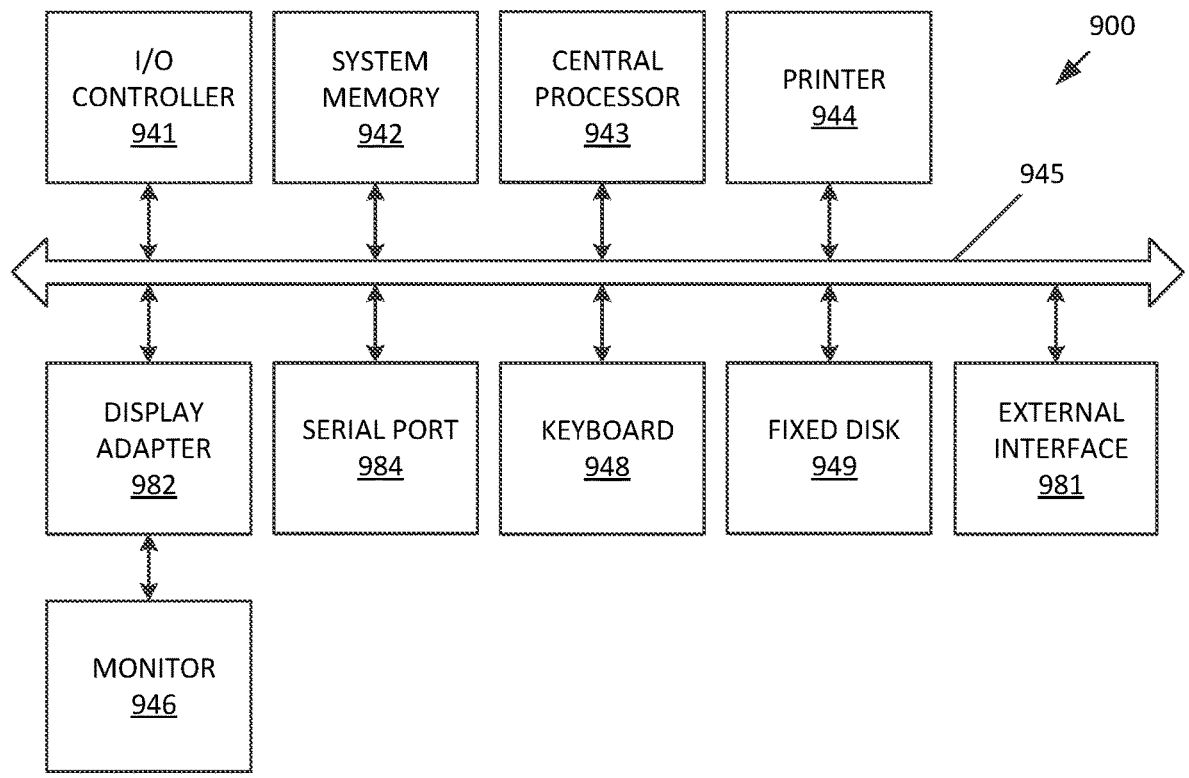
FIG. 9 illustrates a block diagram of a computer apparatus.

Various user interfaces and/or devices may be implemented to register, authenticate, and/or authorize a credential, as illustrated in FIGS. 7-9.

A. Example User Interfaces

User interface 702 can include functionality to scan an access device identifier at the access device (e.g. the placard, etc.) and/or provide a user device identifier or user device cryptogram of the access device identifier and user device credential to the access device (e.g., a code containing a cryptogram or other user information, etc.). In another example, user interface 704 can display a user device identifier or user device cryptogram of the access device identifier and user device credential for scanning by the access device. In another example, user interface 706 can display a keypad for receiving a user credential or other identifier. Other user interfaces may be implemented without diverting from the essence of the disclosure.

B. Example Devices

FIG. 8 is a functional block diagram illustrating a portable communication device that may be used to perform mobile banking operations, such as initiating transactions with a stored value device, in accordance with some embodiments of the present invention. Portable communication device 802 may include circuitry that is used to enable certain device functions, such as telephony. The functional elements responsible for enabling those functions may include a processor 804 that is programmed to execute instructions that implement the functions and operations of the device. Processor 804 may access data storage 812 (or another suitable memory region or element) to retrieve instructions or data used in executing the instructions. Data input/output elements 808 may be used to enable a user to input data (via a microphone or keyboard, for example) or receive output data (via a speaker, for example). Display 806 may also be used to output data to a user. Communications element 810 may be used to enable data transfer between device 802 and a wireless network (via antenna 818, for example) to assist in enabling telephony and data transfer functions.

Device 802 may also include contactless element interface 814 to enable data transfer between contactless element 816 and other elements of the device, where contactless element 816 may include a secure memory and a near field communications data transfer element (or another form of short range communications technology). As noted, a mobile phone or similar device is an example of a portable communication device that may be used to display alerts as described with reference to embodiments of the present invention. However, other forms or types of devices may be used without departing from the underlying concepts of the invention. Further, devices that are used to display alerts may not require the capability to communicate using a cellular network in order to be suitable for use with embodiments of the present invention.

The various participants and elements described herein with reference to exemplary systems may operate one or more computer apparatuses to facilitate the functions described herein. Any of the elements in the figures described herein, including any servers or databases, may use any suitable number of subsystems to facilitate the functions described herein.

FIG. 9 shows a block diagram of a computer apparatus, according to some embodiments. The subsystems shown in FIG. 9 are interconnected via a system bus 945. Additional subsystems include a printer 944, keyboard 948, fixed disk 949, and monitor 946, which is coupled to display adapter 982. Peripherals and input/output (I/O) devices, which couple to I/O controller 941, can be connected to the computer system by any number of means known in the art, such as a serial port. For example, serial port 984 or external interface 981 can be used to connect the computer apparatus to a wide area network such as the Internet, a mouse input device, or a scanner. The interconnection via system bus 945 allows the central processor 943 to communicate with each subsystem and to control the execution of instructions from system memory 942 or the fixed disk 949, as well as the exchange of information between subsystems. The system memory 942 and/or the fixed disk may embody a computer-readable medium.

As described, the system may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
   receiving, at an authentication computer, an authentication request message, wherein the authentication request message includes a user device identifier that uniquely identifies a user device to the authentication computer, authentication data associated with an access device, and a received cryptogram, wherein the authentication data includes a timestamp, an access device identifier corresponding to the access device and uniquely identifies the access device to the authentication computer, wherein the received cryptogram is generated from the access device identifier and a user device credential;

selecting the user device credential from a set of user device credentials using the user device identifier and based on a portion of the timestamp, the user device credential selected to correspond to the user device, wherein the user device credential is registered with the authentication computer in association with the user device, wherein the selecting the user device credential comprises dividing the portion of the timestamp by a number of user device credentials in the set of user device credentials and using a remainder from the dividing;

in response to the selecting the user device credential, generating a generated cryptogram using the access device identifier and the user device credential, wherein the generating the generated cryptogram includes: generating a user device cryptogram using the access device identifier and the user device credential, selecting an access device credential stored at the authentication computer using the user device identifier, and generating the generated cryptogram using the user device cryptogram and the access device credential, wherein the access device credential comprises a user credential provided to the access device;

comparing the received cryptogram and the generated cryptogram; and based on the received cryptogram and the generated cryptogram matching, transmitting an authentication response message to the access device to instruct the access device that the user device is authenticated, thereby causing the access device to proceed with a process for granting access to the user device.

2. The method of claim 1, further comprising:
verifying the access device identifier by matching the access device identifier with a stored identifier determined during a registration process with the access device.

3. The method of claim 1, wherein selecting the user device credential comprises: determining the portion of the timestamp included in the authentication data; and using the portion of the timestamp to select the user device credential from the set of user device credentials according to one or more predetermined rules.

4. The method of claim 1, wherein before the authentication request message is received, the method comprises, as part of a registration process: selecting a first prompt from a first list; providing the first prompt to the user device; receiving a first response to the first prompt from the user device; and storing the first response to the first prompt in a first set associated with the user device identifier, wherein the access device credential is selected from the first set.

5. The method of claim 4, further comprising:
selecting a second prompt from a second list, wherein the first list and the second list are mutually exclusive;
providing the second prompt to the user device;
receiving a second response to the second prompt from the user device; and
storing the second response to the second prompt in a second set associated with the user device identifier, wherein the user device credential is selected from the second set.

6. The method of claim 1, wherein the authentication request message includes a third cryptogram created by signing at least a portion of the authentication data using a third user credential, the method further comprising:

selecting a fourth user credential using the user device identifier;

generating a fourth cryptogram using at least the portion of the authentication data and the fourth user credential; and comparing the third cryptogram and the fourth cryptogram to determine the authentication response message.

7. The method of claim 6, wherein the authentication response message instructs the access device that the user device is authenticated when the generated cryptogram matches the received cryptogram and when the third cryptogram matches the fourth cryptogram, and wherein the fourth user credential is selected from a first set of user credentials that is different than a second set of user credentials from which the third user credential is selected.

8. An authentication computer comprising:
a memory;
one or more processors; and
a non-transitory computer readable medium storing a plurality of instructions for controlling the one or more processors to perform operations comprising:
receiving an authentication request message, wherein the authentication request message includes a user device identifier that uniquely identifies a user device to the authentication computer, authentication data associated with an access device, and a received cryptogram, wherein the authentication data includes a timestamp, an access device identifier corresponding to the access device and uniquely identifies the access device to the authentication computer, wherein the received cryptogram is generated from the access device identifier and a user device credential;

selecting the user device credential from a set of user device credentials using the user device identifier and based on a portion of the timestamp, the user device credential selected to correspond to the user device, wherein the user device credential is registered with the authentication computer in association with the user device, wherein the selecting the user device credential comprises dividing the portion of the timestamp by a number of user device credentials in the set of user device credentials and using a remainder from the dividing;

in response to the selecting the user device credential, generating a generated cryptogram using the access device identifier and the user device credential, wherein the generating the generated cryptogram includes: generating a user device cryptogram using the access device identifier and the user device credential, selecting an access device credential stored at the authentication computer using the user device identifier, and generating the generated cryptogram using the user device cryptogram and the access device credential, wherein the access device credential comprises a user credential provided to the access device;

comparing the received cryptogram and the generated cryptogram; and based on the received cryptogram and the generated cryptogram matching, transmitting an authentication response message to the access device to instruct the access device that the user device is authenticated, thereby causing the access device to proceed with a process for granting access to the user device.

9. The authentication computer of claim 8, wherein the operations further comprising: verifying the access device identifier by matching the access device identifier with a stored identifier determined during a registration process with the access device.

10. The authentication computer of claim 8, wherein selecting the user device credential comprises: determining the portion of the timestamp included in the authentication data; and using the portion of the timestamp to select the user device credential from the set of user device credentials according to one or more predetermined rules.

11. The authentication computer of claim 8, wherein before the authentication request message is received, the operations further comprising, as part of a registration process: selecting a first prompt from a first list; providing the first prompt to the user device; receiving a first response to the first prompt from the user device; and storing the first response to the first prompt in a first set associated with the user device identifier, wherein the access device credential is selected from the first set.

12. The authentication computer of claim 11, wherein the operations further comprising: selecting a second prompt from a second list, wherein the first list and the second list are mutually exclusive; providing the second prompt to the user device; receiving a second response to the second prompt from the user device; and storing the second response to the second prompt in a second set associated with the user device identifier, wherein the user device credential is selected from the second set.

13. The authentication computer of claim 8, wherein the authentication request message includes a third cryptogram created by signing at least a portion of the authentication data using a third user credential, the operations further comprising: selecting a fourth user credential using the user device identifier; generating a fourth cryptogram using at least the portion of the authentication data and the fourth user credential; and comparing the third cryptogram and the fourth cryptogram to determine the authentication response message.

14. The authentication computer of claim 13, wherein the authentication response message instructs the access device that the user device is authenticated when the generated cryptogram matches the received cryptogram and when the third cryptogram matches the fourth cryptogram, and wherein the fourth user credential is selected from a first set of user credentials that is different than a second set of user credentials from which the third user credential is selected.

* * * * *